(12) United States Patent
Francis et al.

(10) Patent No.: US 7,059,810 B2
(45) Date of Patent: Jun. 13, 2006

(54) GEAR HOBBING CUTTER SYSTEM

(75) Inventors: Mark A. Francis, Solon, OH (US); David M. Hray, Solon, OH (US)

(73) Assignee: Kennametal Inc., Latrobe, PA (US)

( * ) Notice: Subject to any disclaimer, the term of this patent is extended or adjusted under 35 U.S.C. 154(b) by 174 days.

(21) Appl. No.: 10/125,146

(22) Filed: Apr. 18, 2002

(65) Prior Publication Data
US 2003/0198524 A1 Oct. 23, 2003

(51) Int. Cl.
*B26D 1/12* (2006.01)
(52) U.S. Cl. .................. 407/23; 407/25; 407/113
(58) Field of Classification Search .............. 407/20, 407/21, 22, 23, 24, 25, 26, 27, 28, 113, 120, 407/107; 82/1.11
See application file for complete search history.

(56) References Cited

U.S. PATENT DOCUMENTS

| | | | | |
|---|---|---|---|---|
| 2,126,004 A | | 8/1938 | Gleason | |
| 3,731,356 A | * | 5/1973 | Gowanlock | 407/107 |
| 3,760,476 A | * | 9/1973 | Kotthaus | 407/107 |
| 3,961,403 A | | 6/1976 | Hunkeler | 29/105 |
| 4,115,024 A | * | 9/1978 | Sussmuth | 407/114 |
| 4,621,954 A | * | 11/1986 | Kitchen | 407/22 |
| 4,856,942 A | * | 8/1989 | Bernadic et al. | 407/114 |
| 5,004,378 A | * | 4/1991 | Arai et al. | 407/106 |
| 5,137,402 A | | 8/1992 | Ball et al. | 409/234 |
| 5,542,791 A | | 8/1996 | Ball et al. | 407/21 |
| 6,311,590 B1 | | 11/2001 | Stadtfeld | 82/1.11 |
| 2001/0028831 A1 | | 10/2001 | Iizuka et al. | 407/21 |

* cited by examiner

*Primary Examiner*—Willmon Fridie, Jr.
(74) *Attorney, Agent, or Firm*—Larry R. Meenan (57) ABSTRACT

A gear hobbing cutter system that includes a cutter head body having a plurality of cartridge-receiving slots arranged in pairs comprising an inside and an outside cartridge-receiving slot. Each pair of inside and outside cartridge-receiving slots are capable of receiving a respective inside and outside cartridge assembly. To ensure that the inside and outside cartridge assemblies are properly positioned within their respective cartridge-receiving slots, one of the dimensions, preferably the length, of the inside cartridge-receiving slot and its respective inside cartridge assembly of a pair is different than the outside cartridge-receiving slot its respective outside cartridge assembly so as to form an error proofing system. In addition, the invention provides for a cartridge assembly including a cutting insert that can be indexable to at least two cutting edges, thereby providing cost savings as compared to conventional cutter systems that use cutter blades that required to be entirely scraped when worn or broken.

36 Claims, 7 Drawing Sheets

GEAR HOBBING CUTTER SYSTEM

BACKGROUND OF THE INVENTION

1. Field of the Invention

The present invention is directed to cutting tools for producing toothed articles, and in particular to a gear hobbing cutter system for producing gears by face hobbing methods.

2. Description of the Related Art

In the manufacture of bevel and hypoid gears with curved flank lines, for example, the cutting tools utilized are primarily face mill or face hob cutters, such types of cutting tools are well known in the art of gear manufacture. In face mill cutters the cutting blades are arranged in the cutter head such that one tooth slot is formed with each plunge of the cutter and the cutter must be withdrawn and the workpiece indexed to the next tooth slot position in order to form the next tooth slot.

Face hobbing comprises cutting blades arranged about a cutter, not in line with each other, but in groups, with usually two or three cutting blades per group. In two-blade groups, the blade pair comprises an inner cutting blade and an outer cutting blade. In the three-blade group, a "bottom" cutting blade is included along with an inside and outside cutting blade.

Unlike most face milling processes, in which all cutting blades pass through the tooth slot during its formation, face hobbing comprises each successive group of cutting blades passing through respective successive tooth slots with each blade in the group forming a cut completely along the longitudinal portion of the tooth slot. The cutter and the workpiece rotate in a timed relationship with each other, thereby allowing continual indexing of the workpiece and continual formation of each tooth slot of the gear. For example, in the hobbing process of generating a gear tooth, the appropriate generating motions are superimposed with the timed relationship rotations of the tool and workpiece. Thus, in face hobbing, a single plunge of the cutting tool results in all tooth slots of the workpiece being formed.

Cutting tools for face hobbing processes usually consist of disk-shaped cutter heads with stick-type cutting blades, made from bar stock high speed steel (HSS), for example, which are inserted and positioned in slots formed in the cutter heads. Each cutting blade comprises a face portion oriented at a predetermined angle known as a side rake angle, cutting edge, a cutting side surface oriented at a predetermined relief angle, clearance edge, clearance side surface oriented at a predetermined relief angle, and a top surface.

To have each blade of one kind, especially inner or outer blades, producing the same chip thickness and therefore having the same load and wear, the radial location of the cutting edge is most important. Tolerances of the blade shank and the cutting edge location relative to the shank as well as tolerances of "wear" of the slots in the cutter head can add up to unacceptable tolerances.

However, while the radial position of a cutting blade is important in both face milling and face hobbing operations, the position of the front face (index position) of a cutting blade is also important in face hobbing processes. This can be understood when the timed relationship between the rotating tool and rotating workpiece is considered. If a cutting blade is not in its proper position (index position) with respect to other like blades in the cutter head, the cutting blade will arrive either early or late to its respective tooth slot. As such, the chips removed from the tooth slot will be either thicker or thinner than those produced by other cutting blades in other tooth slots thus introducing uneven load and wear in the cutting tool.

The inventor of the present invention has recognized these and other problems and has developed an improved gear hobbing cutting system.

SUMMARY OF THE INVENTION

It is a feature of the invention to provide an improved gear hobbing cutter system. In one aspect of the invention, the gear hobbing cutter system may include an error proofing system for ensuring that the cartridges and blades are properly positioned in the cutter head body. In another aspect of the invention, the gear hobbing cutter system includes a plurality of blades comprising indexable inserts that can provide at least two cutting edges, thereby providing a more cost-effective cutting system.

The present invention comprises a cutter system comprising a disc-shaped cutter head body with a plurality of apertures formed about a periphery of the cutter head body. The apertures are designed to receive clamping members. At least one pair of cartridge-receiving slots is formed in the cutter head body including an outside cartridge-receiving slot capable of receiving an outside cartridge assembly and an inside cartridge-receiving slot capable of receiving an inside cartridge assembly. A plurality of clamping slots are formed in the cutter head body, each clamping slot positioned between the periphery of the cutter head body and a respective cartridge-receiving slot to form a deformable area of the cutter head body therebetween. The outside cartridge-receiving slot has a different dimension than the inside cartridge-receiving slot, thereby forming an error proofing system to ensure that the outside and inside cartridge assemblies are properly positioned into their respective cartridge-receiving slots.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Referring to the drawings, wherein like reference characters represent like elements, there is shown a gear hobbing cutter system 40 for producing gears by face hobbing methods. The gear hobbing cutter system 40 includes a disc shaped cutter head body 42 and a plurality of cartridge assemblies 10 including cutting inserts 12 retained within cartridge receiving slots 50 by clamping members 46.

FIGS. 1–4 illustrate a cartridge assembly, shown generally at 10, which can be formed and used in the cutter system, such as a gear hobbing cutter system, in accordance with the teachings of the present invention. The illustrated cartridge assembly may be formed from relatively thin stock material, such as 4340 steel, as illustrated, or thicker material may be used. One aspect of the invention is that the cartridge assembly 10 includes a cutting insert 12 and a cartridge 14 having a supporting block 16 in which the insert 12 can be mounted, unlike conventional cutter assemblies that include a unitary cutter blade. The supporting block 16 is preferably integrally formed with the cartridge 14, however, it is contemplated that the supporting block 16 can be formed separately from the cartridge 14 and secured to the cartridge 14 by using conventional fastening means, such as a threaded fastener, or the like.

Figure 1:
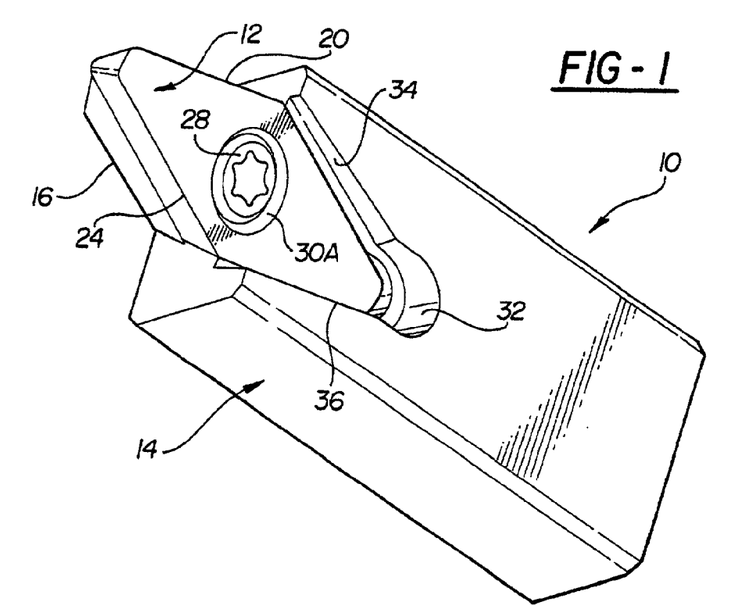
FIG. 1 is an isometric view of a cartridge assembly according to an embodiment of the invention.
Figure 2:
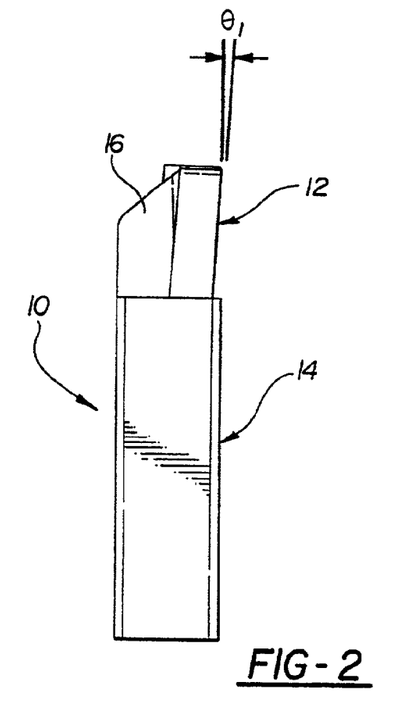
FIG. 2 is a side elevational view of the cartridge assembly.

As best seen in FIG. 1–4, the front face or front surface 17 of the supporting block 16 forms a mounting pocket for receiving a cutting insert 12. Preferably, the back face of the cutting insert 12 is generally complimentary formed so as to mate with the front face 17 of the supporting block 16. After the cutting insert 12 is seated or mated in the mounting pocket of the supporting block 16, the cutting insert 12 is tightly secured to the supporting block by a locking fastener 28 (shown in FIG. 1), such as an Allen or Torx screw that passes through a clearance hole 30 located in the cutting insert 12 and threads into a threaded hole (not shown) in the supporting block 16. The clearance hole 30 includes a tapered counterbore 30A, which is engaged by a corresponding tapered surface on the head of the locking fastener 28, thereby allowing the cutting insert 12 to be tightly secured to the supporting block 16 as the locating fastener 28 pushes downward against the tapered counterbore 30A. A relief 32 may be located at the intersection of the two tapered walls 34, 36 of the supporting block 16 to provide a locating surface and prevent the cutting insert 12 from binding with the cartridge 14. As best seen in FIG. 2, the cutting insert 12 has a positive axial rake angle, for example, of about 5 degrees, but the axial rake angle, $\theta_1$, can be in the range of between about 0 degrees to about 30 degrees.

Figure 3:
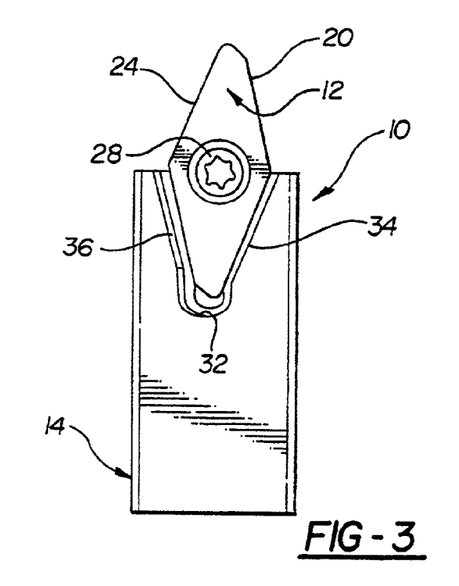
FIG. 3 is a front elevational view of the cartridge assembly.
Figure 4:
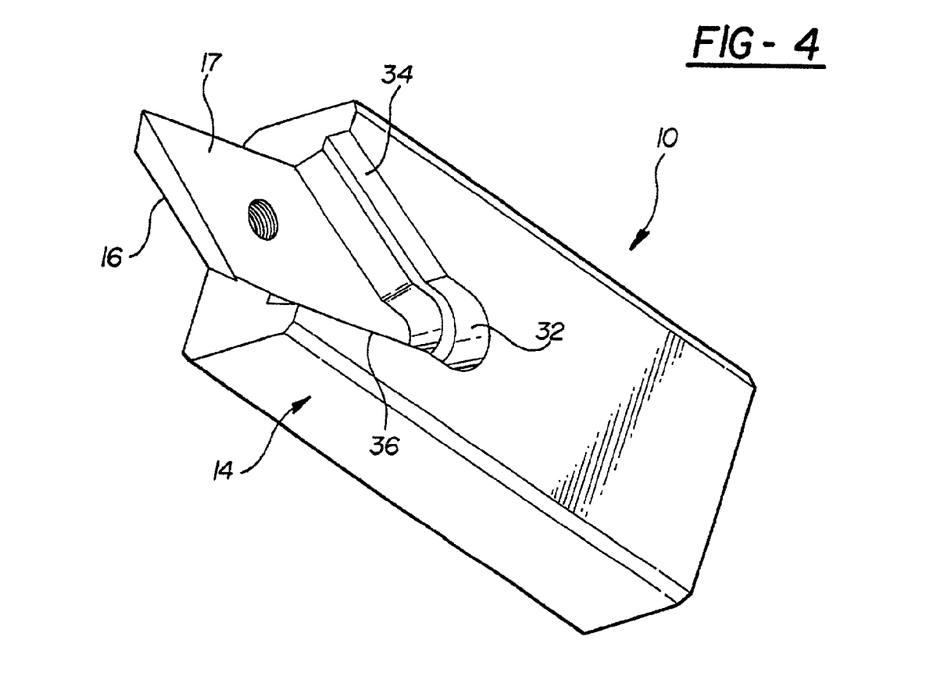
FIG. 4 is an isometric view of a cartridge assembly according to an embodiment of the invention with the insert removed.

FIGS. 5–9 illustrate portions of a cutter system 40 which is designed to carry the type of cartridge assembly 10 illustrated in FIGS. 1–3. Although the cutter system 40 is shown in a gear hobbing cutter embodiment, the cutter system 40 can be used in any type of face milling or hobbing operation. The gear hobbing cutter system 40 includes a disc-shaped cutter head body 42. The cutter head body 42 can be formed in a known fashion to include means for being mounted on a spindle of a gear cutting machine (not shown).

Figure 5:
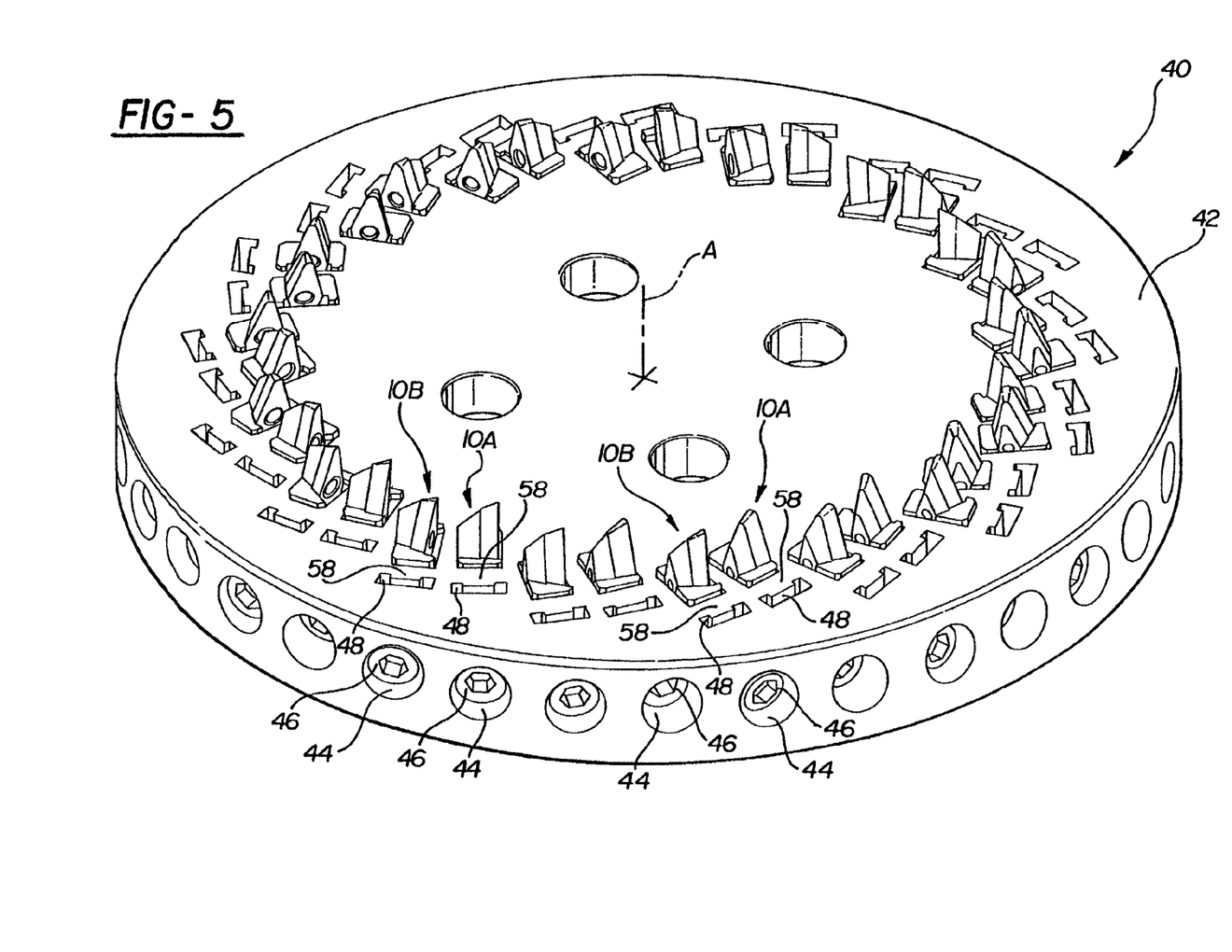
FIG. 5 is an isometric view of the cutter system incorporating the cartridge assembly of FIG. 1 according to an embodiment of the invention.
Figure 6:
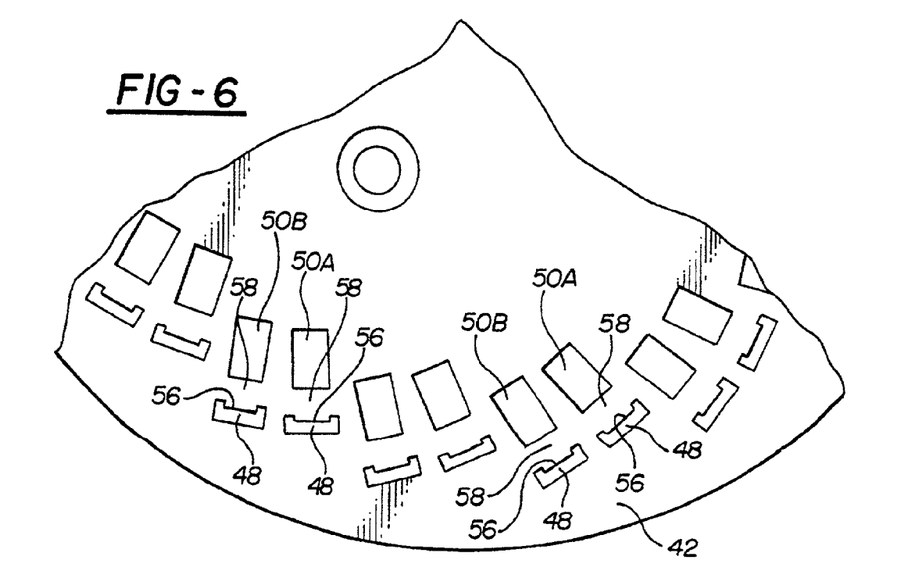
FIG. 6 is a partial top view of the cutter head body of the cutter system of FIG. 5 with the cartridge assemblies removed.
Figure 7:
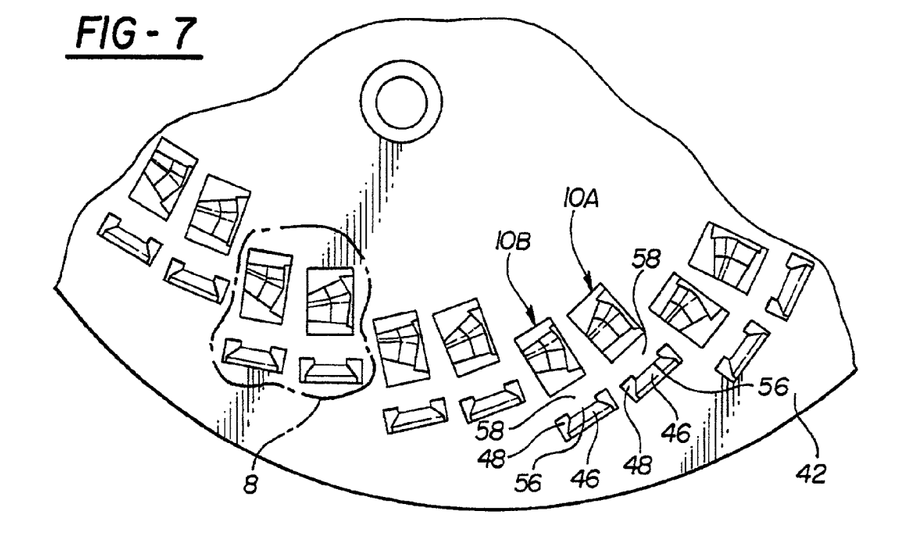
FIG. 7 is a partial top view of the cutter head body of the cutter system of FIG. 5 with the cartridge assemblies installed.

The cutter head body 42 includes a plurality of threaded apertures 44 formed into its periphery for receiving clamping members 46, such as bolt, threaded screw, or the like. It can be seen that each aperture 44 is substantially identical in form and generally equally spaced from a next adjacent aperture about the periphery of the cutter head body 42. The apertures 44 are radially aligned with and in communication with clamping slots 48 further described below.

As best shown in FIG. 6, the cutter head body 42 also includes a plurality of clamping slots 48 and a plurality of cartridge-receiving slots 50 arranged in pairs at predetermined angles with respect to the central axis, A, of the cutter head body 41. It will be appreciated that although a pair of blades per group is shown in a prefered embodiment, it will be readily appreciated by one skilled in the art that once the invention is disclosed and explained that the invention is equally applicable to more than a pair of blades per group. For example, the cutter head body 41 includes at least one pair of cartridge-receiving slots 50 comprising an inside cartridge-receiving slot 50A and an outside cartridge-receiving slot 50B designed to receive and accommodate an inside cartridge assembly 10A and an outside cartridge assembly 10B, respectively. In this configuration, the cutting inserts in the inside cartridge assembly 10A and the outside cartridge assembly 10B may have different cutting functions that can be arranged in sets of pairs around the cutter head body 42. In addition, the cutting inserts in the inside cartridge assembly 10A and the outside cartridge assembly 10B may have different dimensions to accommodate their different cutting functions.

Each clamping slot 48 includes a clamping pad 56 that projects radially outwardly in a direction toward the clamping member 46. The clamping pad 56 is designed to distribute the biasing force provided by the clamping member 46 when the clamping member 46 is tightened and bears against the clamping pad 56. In the illustrated embodiment, each clamping pad 56 is generally rectangular shape in cross-section, but can be any desirable cross-sectional shape to optimally distribute the biasing force provided by the clamping member 46. As best shown in FIGS. 8–11, a deformable area 58 of the body 42 is formed between the cartridge-receiving slots 50 and the clamping slots 48. Specifically, the deformable area 58 includes an appropriate distance, d, between clamping pad 56 and the clamp-receiving slots 50A, 50B. The appropriate distance, d, allows the deformable area 58 to bear against the cartridge assemblies 10A, 10B when the clamping member 46 provides a sufficient amount of biasing force against the clamping pad 56. It will be appreciated that the appropriate distance, d, is dependent upon the material properties of the cutter body 42. For example, in the illustrated embodiment of the invention, the distance, d, can be in the range between about 0.200 to about 0.400 inches, and preferably about 0.260 inches for a cutter body made of spring steel.

Figure 8:
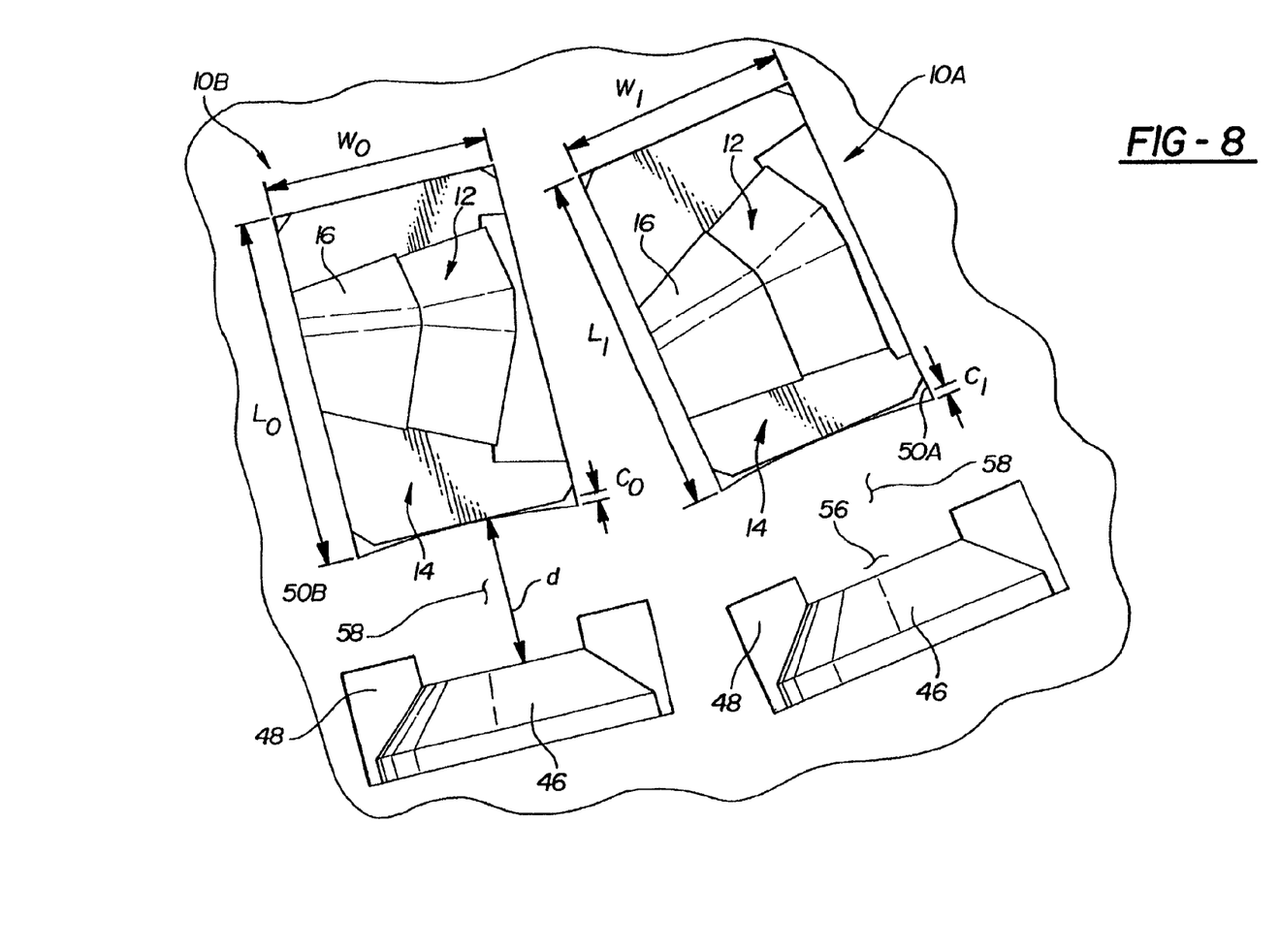
FIG. 8 is an enlarged top view of a pair of inside and outside cartridge assemblies in their respective cartridge-receiving slots as designated by the dashed lines in FIG. 7.
Figure 9:
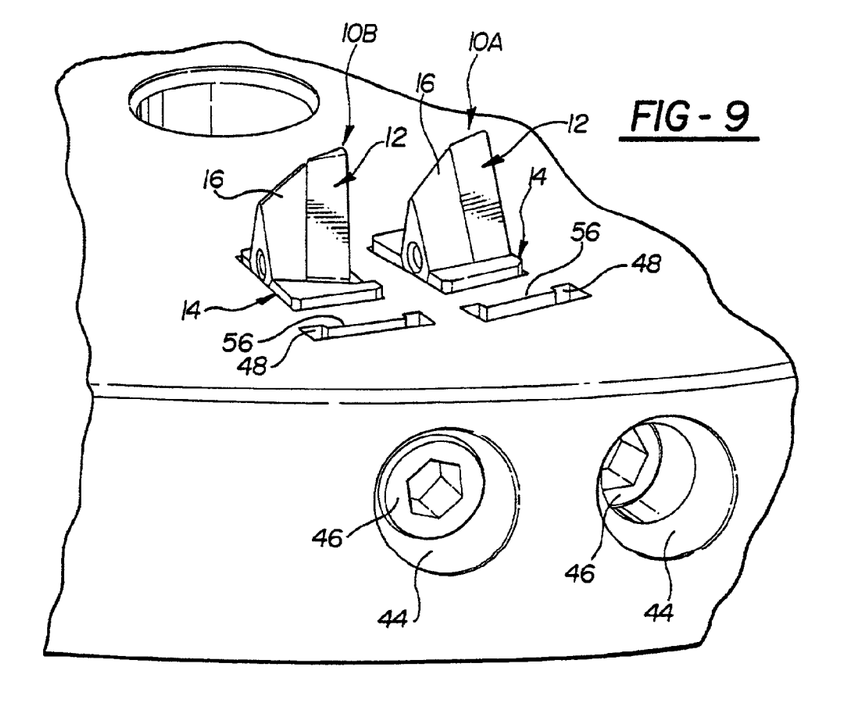
FIG. 9 is an enlarged isometric view of a pair of inside and outside cartridge assemblies in their respective cartridge-receiving slots as designated by the dashed lines in FIG. 7.
Figure 10:
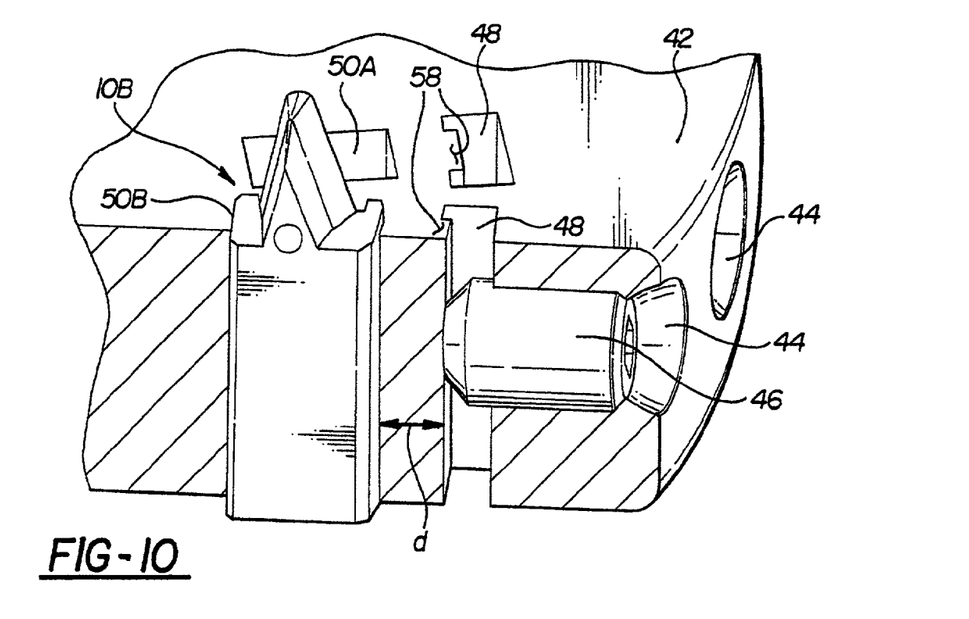
FIG. 10 is an isometric view in partial cross section of an outer cartridge assembly in its respective cartridge-receiving slot with an inside cartridge assembly being removed to illustrate a clamping member providing a biasing force against a clamping pad in accordance with the invention.
Figure 11:
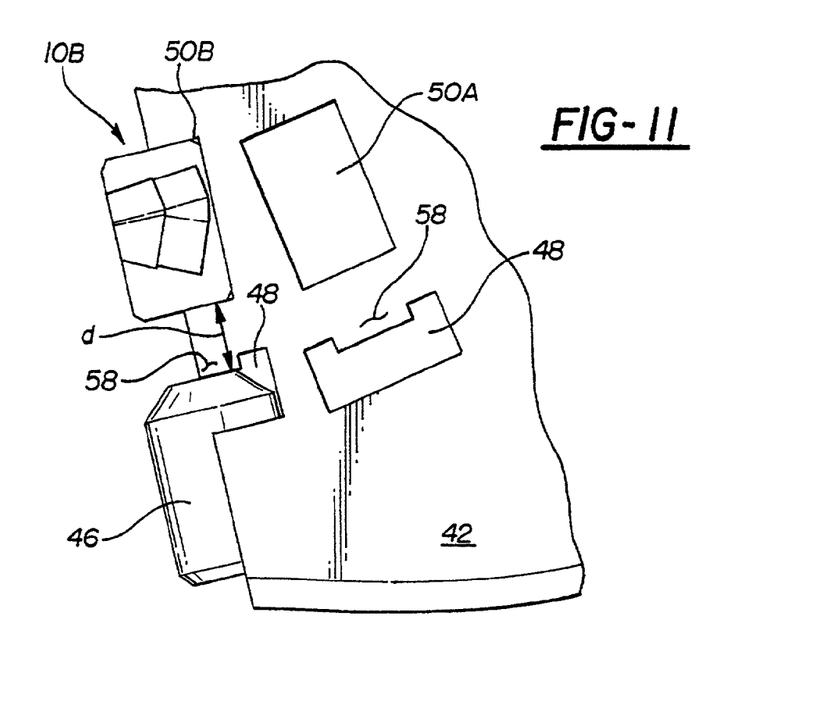
FIG. 11 is a top view of FIG. 10.
Figures 12, 13:
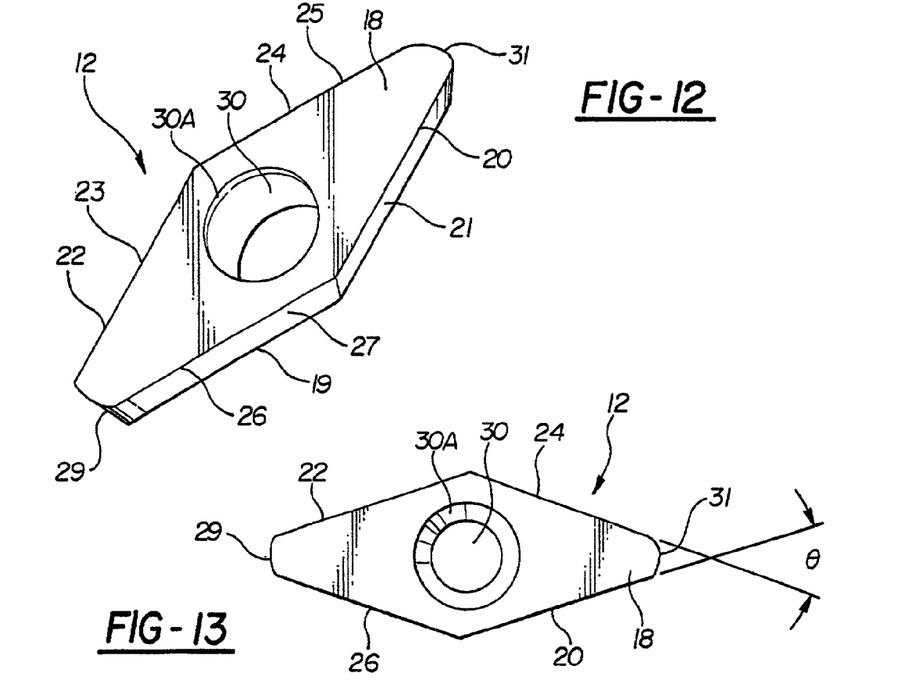
FIG. 12 is an isometric view of a cutting insert according to an embodiment of the invention.
FIG. 13 is a top view of the cutting insert of FIG. 12.
Figure 14:
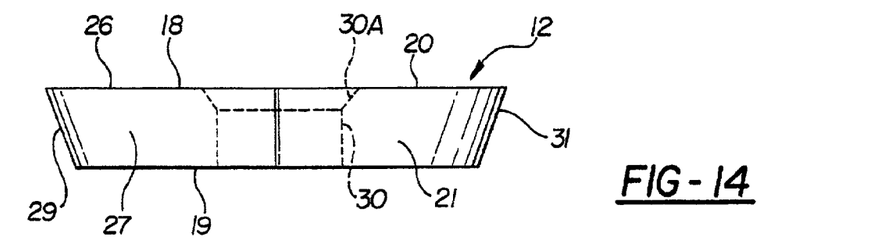
FIG. 14 is a side view of the cutting insert of FIG. 12.
Figure 15:
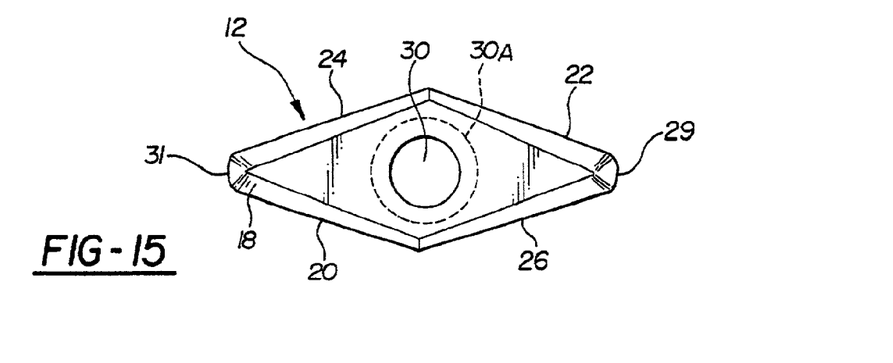
FIG. 15 is a bottom view of the cutting insert of FIG. 12.

The individual cartridge assemblies 10 that form the inside cartridge assemblies 52 and the outside cartridge assemblies 54 are received into their respective cartridge-receiving slots 50A, 50B. One aspect of the present invention is an error proofing system that ensures that the inside and the outside cartridge assemblies 10A, 10B are properly positioned into their respective cartridge-receiving slots 50A, 50B. The error proofing system is realized by configuring the inside cartridge-receiving slot 50A with different dimensions, such as a length or a width, than the outside cartridge-receiving slot 50B, or vice versa. In other words, a length, $L_I$, or a width, $W_I$, of the inside cartridge-receiving slot 50A and the corresponding inside cartridge assembly 10A is different than a length, $L_O$, or a width, $W_O$, of the outside cartridge slot 50B and the corresponding outside cartridge assembly 10B.

Because of this dimensional difference, an inside cartridge assembly 10A cannot be inadvertently placed in an outside cartridge-receiving slot 50B. Likewise, an outside cartridge assembly 10B cannot be inadvertently placed in an inside cartridge-receiving slot 50A. Thus, an operator is ensured that the inside and the outside cartridge assemblies 10A, 10B are properly positioned into their respective cartridge-receiving slots 50A, 50B.

In addition, the length and width of the cartridge-receiving slots 50A, 50B and the length and width of their corresponding cartridge assemblies 10A, 10B are slightly different, for example, by approximately 0.005 inches so as to provide a clearance, $C_I$, $C_O$, between the cartridge assembly 10A, 10B and its respective cartridge-receiving slot 50A, 50B when the cartridge assembly 10A, 10B is properly positioned within the cartridge-receiving slot 50A, 50B. More specifically, the length $L_I$, $L_O$ of the cartridge 14 of the cartridge assemblies 10A, 10B are slightly different than the length $L_I$, $L_O$ of their cartridge-receiving slots 50A, 50B. Because of the clearance, $C_I$, $C_O$, the inside or outside cartridge assembly 10A, 10B can be properly positioned in its respective cartridge-receiving slot 50A, 50B. However, the deformable area 58 will bear against the inside or outside cartridge assembly 10A, 10B when the respective clamping member 46 bears against the clamping pad 56 with a specific clamping force, thereby positively securing its respective cartridge assembly 10A, 10B in the cartridge-receiving slot 50A, 50B.

It should be noted that the inside or outside cartridge assembly 10A, 10B can be removed from its respective cartridge-receiving slot 50A, 50B by causing the clamping member 46 to no longer bear against the clamping pad 56, thereby providing a clearance between the cartridge assembly 10A, 10B and its respective cartridge-receiving slot 50A, 50B because of the resilient nature of the portion of the cutter head body 42 forming the deformable area 58. It should also be noted that the clearances, $C_I$, $C_O$, could be different between the cartridge assembly 10A, 10B and its respective cartridge-receiving slot 50A, 50B when the cartridge assembly 10A, 10B is properly positioned within the cartridge-receiving slot 50A, 5OB.

Referring now to FIGS. 12–15, the cutting insert 12 is generally diamond in shape and includes a front face or top surface 18, a first pair of opposed side walls or surfaces 21, 25, a second pair of opposed side walls or surfaces 23, 27, and a base surface or back face 19 for mating with the front face 17 of the supporting block 14. In the illustrated embodiment, the top face 18 and the back face 19 have a substantially flat profile shape. However, other profile shapes are contemplated and the invention can be practiced with top and bottom faces having any desired profile shape. Formed at the intersection between the top surface 18 and the side walls 21, 23, 25, 27 are principally four edges, namely a pair of opposed and spaced apart edges 20 and 22, and another pair of opposed and spaced apart edges 24 and 26. At least one of the edges 20, 22, 24 and 26 is a cutting edge, and preferably at least the two opposite edges are cutting edges, thereby allowing the cutting insert 12 to be indexable.

For example, one embodiment of the invention provides for a cutting insert 12 that is indexable on two cutting edges by rotating the cutting insert 12 by approximately 180 degrees. The edges 20 and 24 preferably form an angle, θ, for example, of approximately 30° with respect to each other. It will be appreciated that the invention is not limited by the angle of the cutting edges, but the invention can be practiced with any desirable angle for the cutting edges. For example, other shapes of inserts are contemplated that include the cutting edges with an angle, θ, in the range between 0° and 60°.

In addition, the cutting insert 12 includes a pair of opposed end walls 29, 31 that may be tapered from the top surface 18 to the bottom surface 19. In other words, the top surface 18 may have a slightly larger surface area than the bottom surface 19. The cutting insert 12 of the invention provides a substantial cost savings because only the cutting insert 12 needs to be replaced when worn, instead of scrapping the entire cutter blade, as in conventional cutter assemblies.

As described above, the present invention provides a cutter system, such as a gear hobbing cutter system, that includes cutting inserts rather than cutter blades as in conventional cutter assemblies, thereby providing a substantial cost savings. In addition, the cutting insert of the invention is indexable with at least two cutting edges, thereby providing additional cost savings as compared to conventional cutter assemblies with cutter blades. Further, the present invention includes an error proofing system that ensures that the cartridge assemblies are properly positioned in their respective cartridge-receiving slots.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutter system, comprising:
   a disc-shaped cutter head body;
   a plurality of apertures formed into a periphery of the cutter head body capable of receiving clamping members;
   at least one pair of cartridge-receiving slots formed in the cutter head body including an outside cartridge-receiving slot capable of receiving an outside cartridge assembly and an inside cartridge-receiving slot capable of receiving an inside cartridge assembly; and
   a plurality of clamping slots formed in the cutter head body, each clamping slot positioned between the periphery of the cutter head body and a respective cartridge-receiving slot to form a deformable area of the cutter head body therebetween,
   wherein the outside cartridge-receiving slot has a different dimension than the inside cartridge-receiving slot, thereby forming an error proofing system to ensure that the outside and inside cartridge assemblies are properly positioned into their respective cartridge-receiving slots.

2. The cutter system of claim 1, wherein each of the inside and outside cartridge assemblies comprises a cartridge, a supporting block and a cutting insert mounted to the supporting block.

3. The cutter system of claim 2, wherein the cutting insert comprises an indexable cutting insert.

4. The cutter system of claim 2, wherein the cartridge has a length so as to provide a clearance between the cartridge and the cartridge-receiving slot when the inside and outside cartridge assemblies are properly positioned into their respective cartridge-receiving slots.

5. The cutter system of claim 4, wherein each clamping slot includes a clamping pad projecting therefrom.

6. The cutter system of claim 5, wherein one of the clamping members bears against the clamping pad, thereby causing the deformable area to bear against the cartridge to secure the cartridge in the cartridge-receiving slot.

7. The cutter system of claim 1, wherein said different dimension is one of a length and a width.

8. A cutter system, comprising:
a disc-shaped cutter head body;
a plurality of apertures formed into a periphery of the cutter head body capable of receiving clamping members;
a plurality of clamping slots formed in the cutter head proximate to the periphery of the cutter head body; and
at least one pair of cartridge-receiving slots formed in the cutter head body including an outside cartridge-receiving slot capable of receiving an outside cartridge assembly and an inside cartridge-receiving slot capable of receiving an inside cartridge assembly, each of the inside and outside cartridge assemblies comprises a cartridge, a supporting block and a cutting insert mounted to the supporting block.

9. The cutter system of claim 8, wherein the cutting insert comprises an indexable cutting insert.

10. The cutter system of claim 8, wherein at least one of the plurality of clamping slots is positioned between the periphery of the cutter head body and a respective cartridge-receiving slot to form a deformable area of the cutter head body therebetween.

11. The cutter system of claim 10, wherein the cartridge has a length so as to provide a clearance between the cartridge and the cartridge-receiving slot when the inside and outside cartridge assemblies are properly positioned into their respective cartridge-receiving slots.

12. The cutter system of claim 11, wherein each clamping slot includes a clamping pad projecting therefrom.

13. The cutter system of claim 12, wherein one of the clamping members bears against the clamping pad, thereby causing the deformable area to bear against the cartridge to secure the cartridge in the cartridge-receiving slot.

14. The cutter system of claim 8, wherein the outside cartridge-receiving slot has a different dimension than the inside cartridge-receiving slot, thereby forming an error proofing system to ensure that the outside and inside cartridge assemblies are properly positioned into their respective cartridge-receiving slots.

15. The cutter system of claim 14, wherein said different dimension is one of a length and a width.

16. A gear hobbing cutter system, comprising:
a disc-shaped cutter head body;
a plurality of apertures formed into a periphery of the cutter head body capable of receiving clamping members;
at least one pair of cartridge-receiving slots formed in the cutter head body including an outside cartridge-receiving slot capable of receiving an outside cartridge assembly and an inside cartridge-receiving slot capable of receiving an inside cartridge assembly; and
a plurality of clamping slots formed in the cutter head body, each clamping slot positioned between the periphery of the cutter head body and a respective cartridge-receiving slot to form a deformable area of the cutter head body therebetween, each clamping slot includes a clamping pad projecting therefrom,
wherein one of the clamping members bears against the clamping pad, thereby causing the deformable area to bear against the cartridge to secure the cartridge in the cartridge-receiving slot.

17. The cutter system of claim 16, wherein each of the inside and outside cartridge assemblies comprises a cartridge, a supporting block and a cutting insert mounted to the supporting block.

18. The cutter system of claim 17, wherein the cutting insert comprises an indexable cutting insert.

19. The cutter system of claim 17, wherein the cartridge has a length so as to provide a clearance between the cartridge and the cartridge-receiving slot when the inside and outside cartridge assemblies are properly positioned into their respective cartridge-receiving slots.

20. The cutter system of claim 16, wherein the outside cartridge-receiving slot has a different dimension than the inside cartridge-receiving slot, thereby forming an error proofing system to ensure that the outside and inside cartridge assemblies are properly positioned into their respective cartridge-receiving slots wherein said different dimension is one of a length and a width.

21. A cutting insert for a gear hobbing cutter system, comprising:
a flat planar front face
a flat planar front face
a first pair of opposed parallel side walls, the side walls taper from the front face to the back face and a second pair of opposed parallel side walls, the side walls taper from the front face to the back face, such that the front face has a larger surface area than the back face;
a pair of opposed end walls joining one of the first pair of the opposed side walls and one of the second pair of the opposed side walls, the end walls taper from the front face to the back face;
two opposing parallel edges formed at an intersection between the front face and the second pair of opposed parallel side walls; and
two opposing parallel cutting edges formed at an intersection between the front face and the first pair of opposed parallel side walls, the opposing parallel cutting edges alternating between the opposing parallel edges;
wherein the cutting insert is capable of being indexable at 180 degrees on the two opposing cutting edges.

22. The cutting insert according to claim 21, wherein one of the cutting edges and an adjacent side edge form an angle of approximately 0 to 60 degrees with respect to each other.

23. The cutting insert according to claim 22, wherein the angle is approximately 30 degrees.

24. The cutting insert according to claim 21, wherein the cutting insert is mounted to a supporting block by abutting the back face of the insert against a front face of the supporting block.

25. The cutting insert according to claim 24, wherein the cutting insert is secured to the supporting block by a locking fastener that passes through a clearance hole located in the cutting insert.

26. The cutting insert according to claim 21, wherein the cutting insert is generally diamond in shape.

27. The cutting insert according to claim 21, wherein the cutting insert, a supporting block, and a cartridge form a cartridge assembly.

28. The cutting insert according to claim 27, wherein the cartridge assembly is mounted to a gear hobbing cutter system.

29. A cartridge assembly for a gear bobbing cutter system, comprising:

a cartridge having an integrally formed supporting block portion; and a cutting insert mounted to the supporting block portion, the cutting insert comprising a front flat planar surface, a back flat planar surface, a first pair of opposed side flat planar surfaces, the side flat planar surfaces taper from the front flat planar surface to the back flat planar surface such that the front flat planar surface has a larger flat planar surface area than the back flat planar surface; an end wall joining the opposed side flat planar surfaces, the end wall tapers from the front flat planar surface to the back flat planar surface, and at least two cutting edges formed at an intersection between the front flat planar surface and the first pair of opposed side walls, wherein the cartridge assembly is capable of being received in a cartridge-receiving slot of a gear hobbing cutter system; and wherein the cutting insert is capable of being indexable on the at least two cutting edges.

30. The cartridge assembly according to claim 29, wherein the cutting insert is indexable on the at least two cutting edges by rotating the cutting insert approximately 180 degrees.

31. The cartridge assembly according to claim 29, wherein the at least two cutting edges form an angle of approximately 0 to 60 degrees with respect to each other.

32. The cartridge assembly according to claim 31, wherein the angle is approximately 30 degrees.

33. The cartridge assembly according to claim 29, wherein the cutting insert is mounted to the supporting block by abutting the back surface of the insert against a front surface of the supporting block.

34. The cartridge assembly according to claim 33, wherein the cutting insert is secured to the supporting block by a locking fastener that passes through a clearance hole located in the cutting insert.

35. The cartridge assembly according to claim 29, wherein the cutting insert is generally diamond in shape.

36. The cartridge assembly according to claim 35, wherein the cutting insert further comprises a second pair of opposed side walls forming cutting edges between the front surface and the second pair of opposed side walls.

* * * * *